(12) United States Patent
Kukkal

(10) Patent No.: US 7,454,485 B2
(45) Date of Patent: Nov. 18, 2008

(54) PROVIDING UNINTERRUPTED MEDIA STREAMING USING MULTIPLE NETWORK SITES

(75) Inventor: Puneet Kukkal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 09/895,432

(22) Filed: Jun. 29, 2001

(65) Prior Publication Data

US 2003/0005040 A1 Jan. 2, 2003

(51) Int. Cl.
*G06F 15/173* (2006.01)

(52) U.S. Cl. .................. 709/223; 709/231; 709/203; 709/226

(58) Field of Classification Search .......... 709/201, 709/223, 224, 226, 233, 217, 202, 203, 231; 370/389; 455/553
See application file for complete search history.

(56) References Cited

U.S. PATENT DOCUMENTS

| | | | | |
|---|---|---|---|---|
| 5,996,015 A * | 11/1999 | Day et al. | ................. | 709/226 |
| 6,112,239 A * | 8/2000 | Kenner et al. | ................ | 709/224 |
| 6,363,260 B1 * | 3/2002 | Achour et al. | ........... | 455/553.1 |
| 6,754,699 B2 * | 6/2004 | Swildens et al. | ............ | 709/217 |
| 2001/0029544 A1 * | 10/2001 | Cousins | ...................... | 709/233 |
| 2001/0052016 A1 * | 12/2001 | Skene et al. | ................ | 709/226 |
| 2002/0009079 A1 * | 1/2002 | Jungck et al. | ............... | 370/389 |
| 2002/0035611 A1 * | 3/2002 | Dooley | ....................... | 709/218 |
| 2002/0062384 A1 * | 5/2002 | Tso | ............................ | 709/229 |
| 2002/0099819 A1 * | 7/2002 | Hattori et al. | ............... | 709/224 |
| 2003/0041094 A1 * | 2/2003 | Lara et al. | ................... | 709/201 |

* cited by examiner

*Primary Examiner*—Asghar Bilgrami
(74) *Attorney, Agent, or Firm*—Blakely, Sokoloff, Taylor & Zafman LLP

(57) ABSTRACT

A system, apparatus, and method are provided for providing uninterrupted media streaming by accessing multiple network sites. According to one embodiment of the present invention, in response to a request from a client for media content, a list of preferred edges sites is generated. The list is then forwarded to the client. A first site from the list is accessed and requested for providing the media content to the client. In the event of a disturbance, a second site from the list is accessed and requested for providing continuous and uninterrupted streaming of the requested media content.

12 Claims, 8 Drawing Sheets

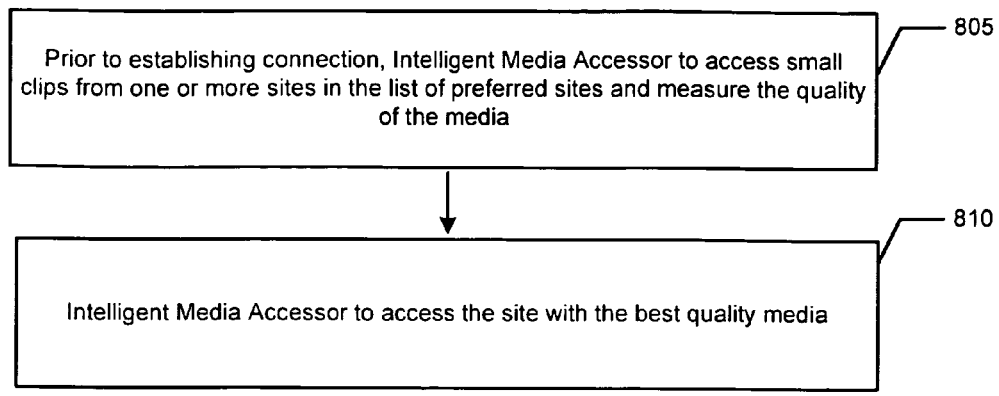
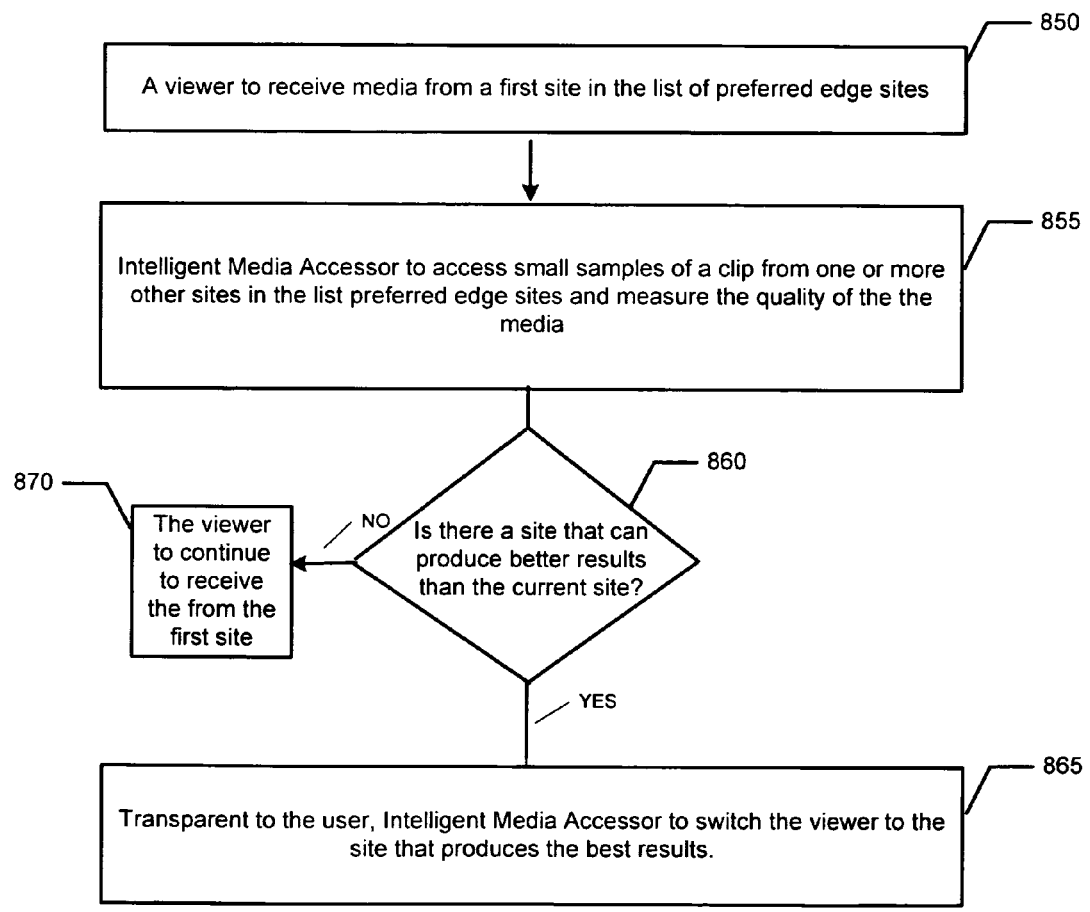

PROVIDING UNINTERRUPTED MEDIA STREAMING USING MULTIPLE NETWORK SITES

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

FIELD OF THE INVENTION

This invention relates to media streaming, in general, and more specifically to providing uninterrupted media streaming using multiple network sites.

BACKGROUND OF THE INVENTION

The idea of providing uninterrupted media streaming is nothing new. Many attempts have been made to provide uninterrupted media streaming without any glitches or interruptions. However, the methods and apparatus available today primarily rely on directing and redirecting a client (viewer/listener) to the site initially linked, with an expectation that the user will get an interrupted stream of media at least most of the time.

Typically, a client accesses a network, and requests certain media content. In response to the request from the client, a site is contacted for providing the requested media content to the client. In the event of a problem, such as disconnection or congestion, the client is redirected back to the original site for reconnection. Therefore, the recovery provided by such a system is limited to serving the requested media content from a particular site, with an expectation that the server keeps serving the requested media content to the client.

The methods and apparatus available today have numerous common problems. For instance, linking back to the original site is understandably very disruptive for clients, because it requires a network to re-process the original link, causing the loss of continuity. Further, upon re-linking, clients have no choice but to experience the media content from the very beginning even if they only wish to reconnect from the time of disconnection. Some media players and broadcasters provide client-side buffering of a few seconds of data in order to compensate for momentary delays in packet delivery. However, such a feature is only effective with an assigned server, and fails if the server crashes or becomes inaccessible for any reason. None of the methods and apparatus, available today, provide clients with the flexibility of choosing from multiple network sites in the event of a problem or attempt to provide automatic and transparent error recovery.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 8a and 8b are flow diagrams illustrating a site selection process, according to one embodiment of the present invention.

DETAILED DESCRIPTION

Figure 1:
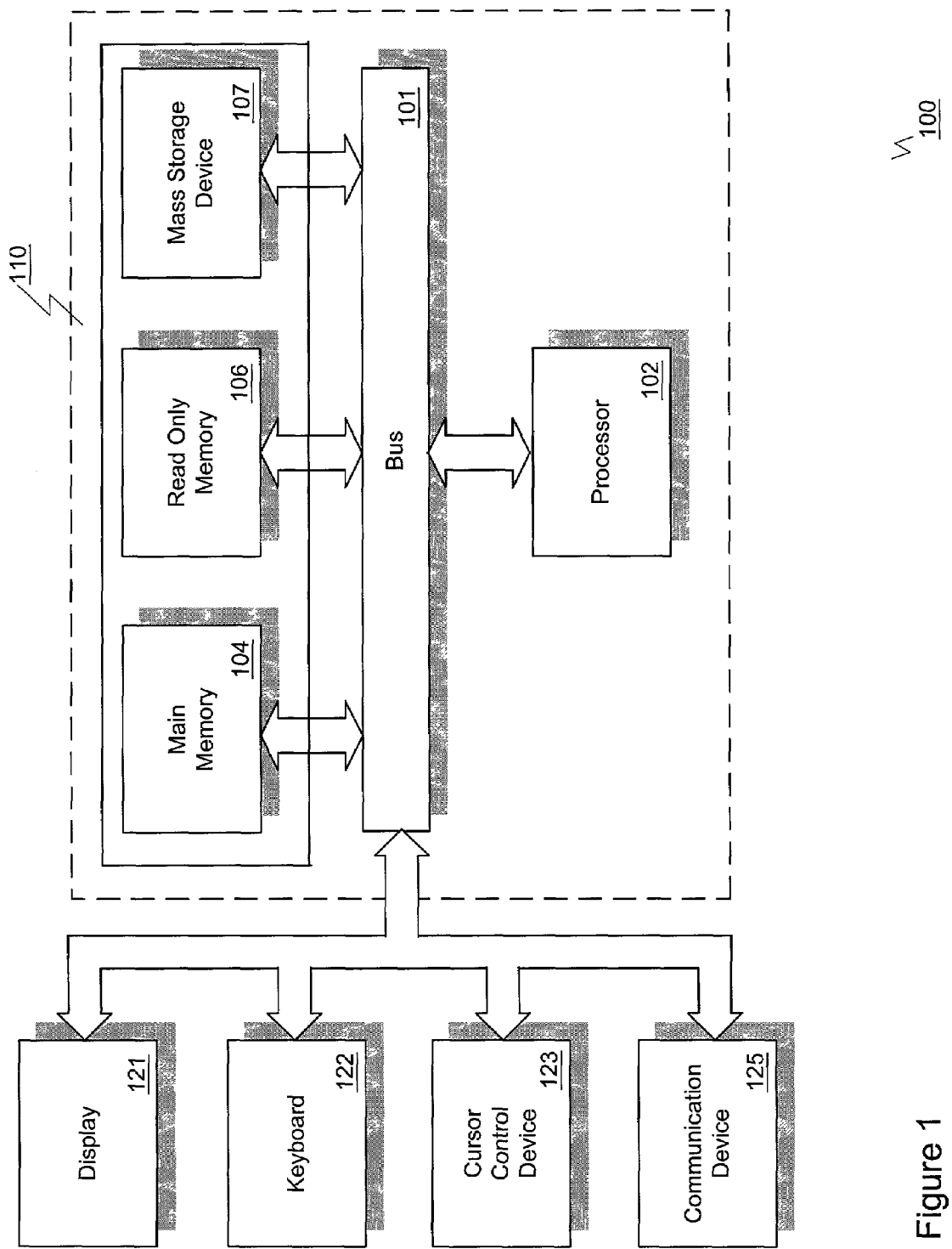
FIG. 1 is a block diagram of a typical computer system upon which one embodiment of the present invention may be implemented.

A method and apparatus are described for providing uninterrupted media streaming. Broadly stated, embodiments of the present invention allow a user (viewer/listener) to receive a reliable uninterrupted stream of media irrespective of disturbance, using multiple network sites.

A system, apparatus, and method are provided for providing uninterrupted media streaming by accessing multiple network sites. According to one embodiment of the present invention, in response to a request from a client for media content, a list of preferred edges sites is generated. The list is then forwarded to the client. A first site from the list is accessed and requested for providing the media content to the client. In the event of a disturbance, a second site from the list is accessed and requested for providing continuous and uninterrupted streaming of the requested media content.

According to one embodiment, an Intelligent Media Accessor runs on the user machine to provide automatic and transparent error recovery. The Intelligent Media Accessor may run in the background and monitor the user's progress with the requested media. If the Intelligent Media Accessor detects any one of several predetermined conditions, such as pausing of the media due to network congestion or loss of the connection, it selects an alternate site from a list provided by the media delivery network. The Intelligent Media Accessor may also access the media with a request to seek into it according to the amount the user had already viewed/listened to. In this manner, the user is able to experience the media in a continuous fashion as a reliable uninterrupted stream from the media delivery network.

According to another embodiment, the Intelligent Media Accessor performs site selection among a plurality of sites offering the desired media using quality metrics measured by sampling portions of the desired media from the plurality of sites. For example, prior to establishing an initial connection or in the background during media viewing, the Intelligent Media Accessor may access small samples of a clip from one or more other sites in the list of preferred edge sites and measure the quality of the media as viewed by the viewer. Then, transparently to the user, the Intelligent Media Accessor may switch the viewer to the site that produces the best results.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to viewers and streaming video, the apparatus and methods described herein are equally applicable to various other types of media and multimedia. For example, viewers and/or listeners may receive steaming audio and video, streaming audio, text, graphics, animation, data, and the like.

FIG. 1 is a block diagram of a typical computer system upon which one embodiment of the present invention may be implemented. Computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well-known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hard-coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 2:
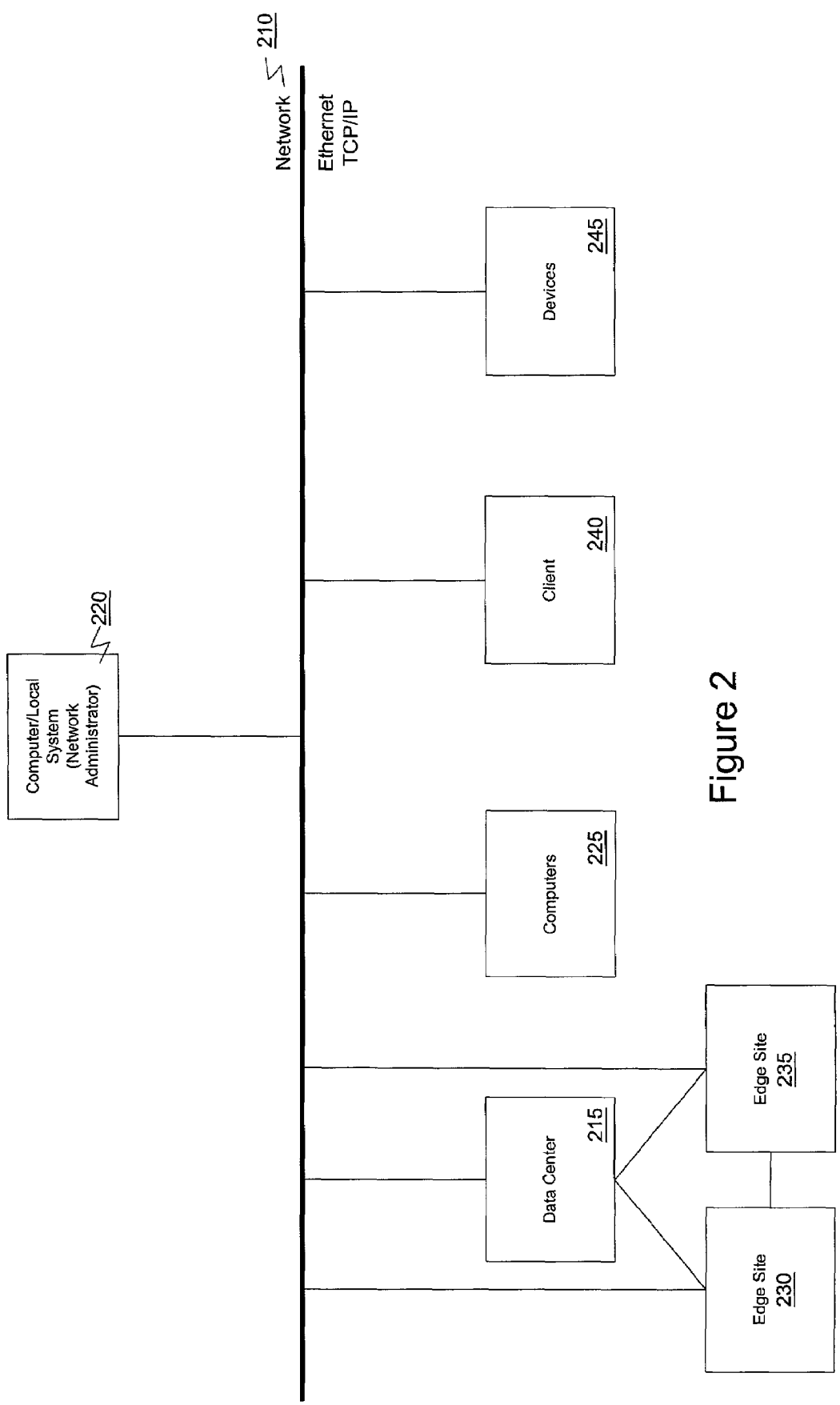
FIG. 2 is a block diagram illustrating an exemplary network upon which the present invention may be implemented.

FIG. 2 is a block diagram illustrating an exemplary network upon which the present invention may be implemented. In this example, an Ethernet network 210 is shown. Such a network may utilize Transmission Control Protocol/Internet Protocol (TCP/IP). Of course, many other types of networks and protocols are available and are commonly used. However, for illustrative purposes, Ethernet and TCP/IP will be referred to herein.

As illustrated, connected to this typical multimedia broadcast network 210 are a number of geographically dispersed sites, i.e., server farms, connected to each other via private links or the Internet. It is widely known in the art that multimedia, by definition, may include the use of text, graphics, animation, audio, and video. Generally, all audio and video applications are considered multimedia applications. Broadcasting generally refers to transmission of data to everyone on a given network, where the network refers to any arrangement of elements that are interconnected. Hence, a multimedia broadcast network 210 may comprise transmitting any combination of voice, video and/or data between users and/or devices that are interconnected. It includes cables and all supporting hardware such as bridges, routers and switches, and in a wireless system, antennas and towers are also part of the network.

One or more of the dispersed sites are configured as data centers 215. A data center 215 is a centralized facility having a master copy of all media content in the network 210. The remaining dispersed sites are configured as edge sites 230-35. The edge sites 230-35 are not centralized, and are typically used to cache high demand content. Since, the storage capabilities at the data center 215 and edge sites 230-35 are vastly different, typically only some portion of the media content is actually cached at the edge sites 230-35.

According to one embodiment of the present invention, a preferred list of the edge sites 230-35 is dynamically generated in response to a media request made by a client 240, such as a video viewer or audio player, for the client 240 to access. In case of disturbance with media streaming from a site on the preferred list, an alternate site is accessed to maintain an uninterrupted and high-quality stream of the requested media content.

The network 210 may comprise a set of computers 220-25, which may include a network administrator terminal 220. A human operator could use this network administrator terminal 220 to monitor and maintain the network 210. Further, a set of devices 245 attached to the network 210 may include network attached storage devices or other types of non-terminal devices. The number and arrangement of this equipment may vary depending on the application.

Figure 3:
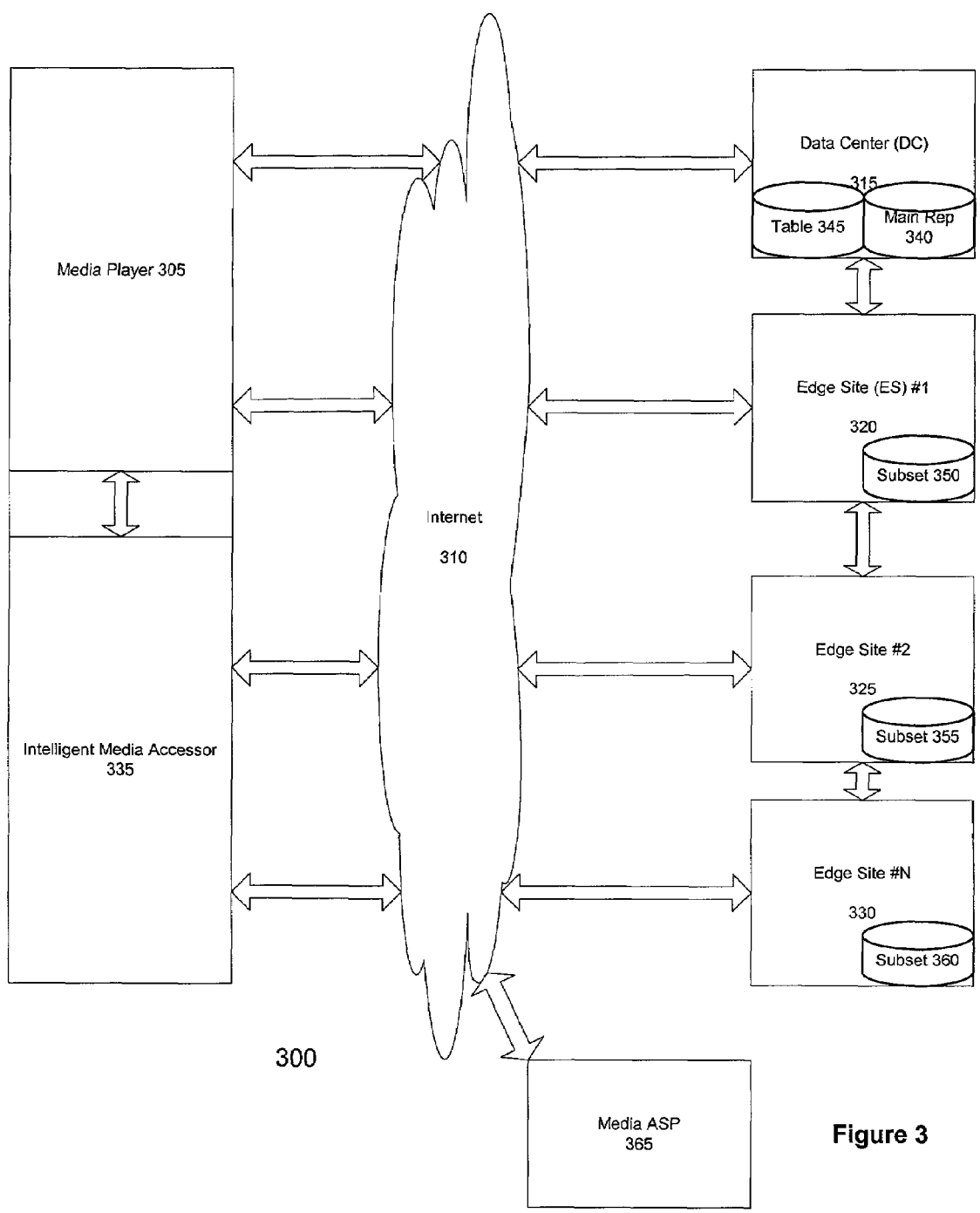
FIG. 3 is a block diagram conceptually illustrating various interactions between an Intelligent Media Accessor and components of a media delivery network, according to one embodiment of the present invention.

FIG. 3 is a block diagram illustrating various interactions between a media delivery network, according to one embodiment of the present invention. As illustrated, a client application 305, such as a video viewer or audio player (media player), having an Intelligent Media Accessor (IMA) 335, accesses a network 300 via the Internet 310, and requests media content. A data center 315 dynamically generates a list of preferred edge sites in response to the media request. The data center 315 then forwards the list to the IMA 335 for accessing the preferred edge sites 320-30. The data center 315 is configured to hold the main repository 340 of the media content, while the edge sites 320-30 comprise subsets 350, 355, 360 of the main repository 340. Further, the data center 315 holds a table or map 345 indicating the media content of the edge sites 320-30. According to one embodiment, the data center 315 generates the preferred list based on a predetermined criteria. The predetermined criteria may include availability of the media content, such as selecting only those edge sites that contain the requested media content. The predetermined criteria may also include selecting edge sites that are close in geographic proximity. Further, the predetermined criteria may include considering those edge sites with a potential for providing acceptable quality-level of the media content, and may include considering edge sites that are not too busy or are free of network congestion.

According to one embodiment of the present invention, the IMA 335 contacts a first 320 of the preferred edge sites, the most preferred edge site, for providing the requested media content to the media player 305. Upon receiving the request, the first edge site 320 begins to send the requested media content. According to one embodiment, the IMA 335 may run in the background and monitor the media player's 305 progress relating to streaming of the requested media content, while the media player 305 experiences the requested media content from the first edge site 320. If the IMA 335 notices any other disturbance relating to the streaming of the requested media content, such as pausing of the requested media content, network congestion, or loss of connection, the IMA 335 accesses a second edge site 325, the second most preferred edge site, based on the predetermined criteria. The IMA 335 solicits the second edge site 325 on the list for continuous streaming of the media content for the media player 305 (without the knowledge of the media player 305). Upon receiving the request, the second edge site 325 starts providing the requested media content to the media player 305, maintaining the uninterrupted stream of information. However, in the event that the second edge site 325 is interrupted, the IMA 335 accesses the next best/preferred edge site 330 on the list for maintaining a continuous flow of the requested media content. Hence, a continuous and uninterrupted flow of the requested media content is provided to the media player 305.

According to one embodiment of the present invention, the IMA 335 accesses the edge sites 320-30 with a request to seek into it the amount of the requested media content the media player 305 has already experienced, e.g., up to the point of disconnection. This allows the media player 305 to experience continuity without requiring it to go back to the beginning of the requested media content, and search for the point of disconnection.

Further, according to one embodiment of the present invention, for quality purposes and potentially for site selection as described below, the IMA 335 accesses and evaluates small samples of media clips from edge sites 320-30 on the preferred list, and switches the media player 305 transparently to the edge site that produces the best result. This allows the media player 305 to continuously experience the highest quality of the requested media content. Hence, the media player 305 remains completely unaware of streaming and quality problems, and continuous to experience uninterrupted requested media content, with highest available quality. The IMA 335, according to one embodiment, may evaluate the samples before accessing the first site, and therefore, may first contact the site with the potential of providing the highest quality of the media content.

According to one embodiment of the present invention, the IMA 335 may introduce various quality-levels to evaluate the quality and streaming of the requested media content based on user preferences. For instance, the media player 305 may request the IMA 335 to access the next best available edge site on the list in the event that the quality of the requested media content falls below a certain quality-level, or to access an alternate edge site if that edge site may provide better quality of the media content than the current edge site. This is to maintain the highest available quality-level for receiving the requested media content.

According to one embodiment of the present invention, the IMA 335 stays fully aware of the speed at which the media player 305 may access the network 300. The system 300 provides continuous streaming of the requested media content at the speed requested by the media player 305. Further, if necessary, the system 300 adjusts and switches transmission rates during the streaming of the requested media content.

According to one embodiment, the system 300 may comprise a Media Application Service Provider (Media ASP) 365. The Media ASP 365 may host applications on its own servers within its own facilities. The media player 405 may rent the application from the Media ASP 365 and access it over the Internet or via a private line connection.

Figure 4:
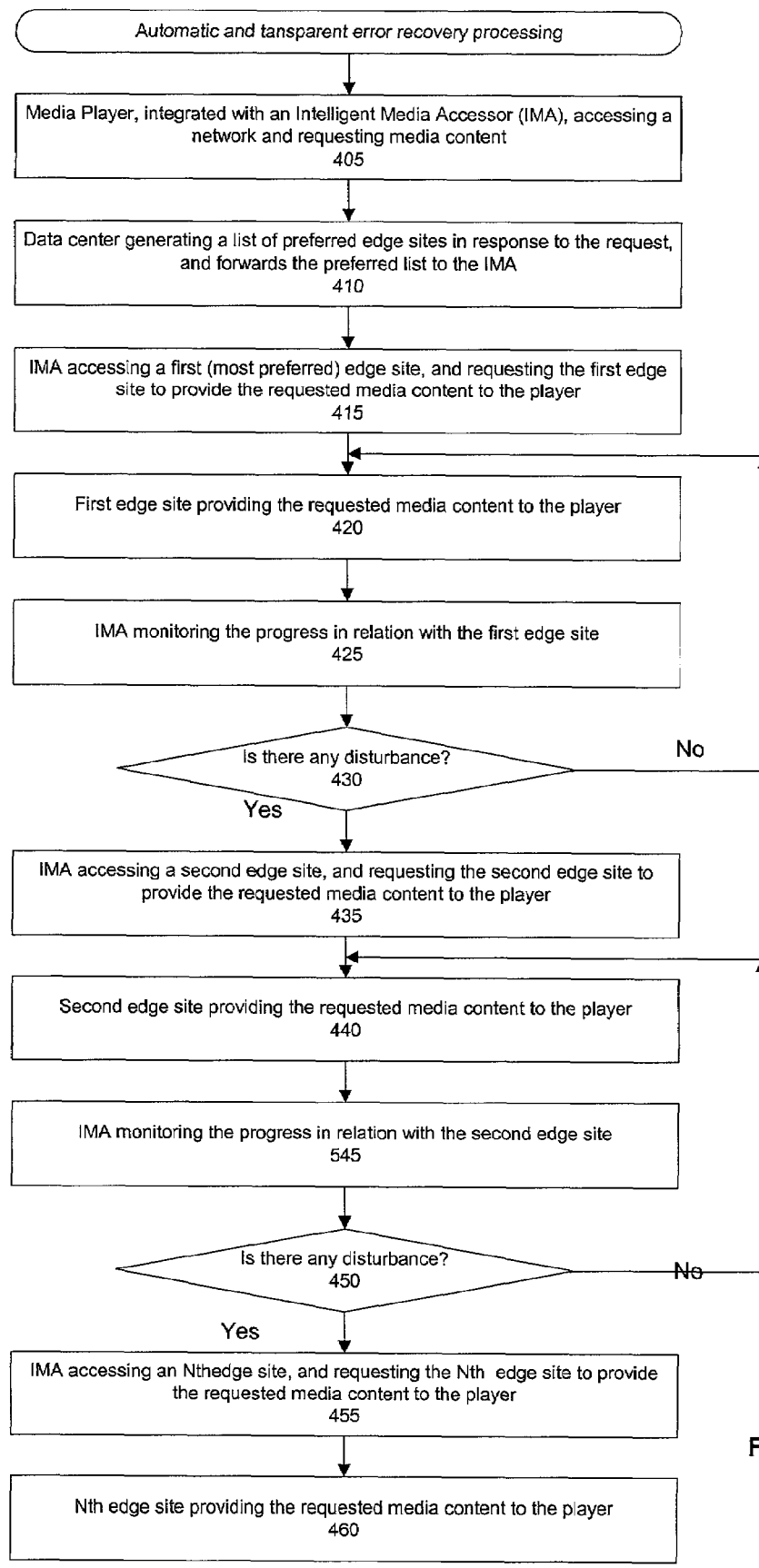
FIG. 4 is a flow diagram illustrating automatic and transparent error recovery processing, according to one embodiment of the present invention.

FIG. 4 is a flow diagram illustrating various interactions between components of a media delivery network, according to one embodiment of the present invention. First, a client application, such as a video viewer or an audio player (media player) having an Intelligent Media Accessor accesses a network and requests media content in processing block 405. A data center receives the request, and upon receiving the request, generates a list of preferred edge sites for the IMA to access in processing block 410. The IMA contacts the first edge site on the list for providing the requested media content to the media player in processing block 415. The first edge site sends the requested media content to the media player in processing block 420. While the media player experiences the requested media content, the IMA monitors the player's progress of the requested media content in relation to the first edge site in processing block 425.

According to one embodiment, the user's progress is monitored both in terms of streaming and quality of the requested media content. At decision block 430, the IMA inquires whether the media player is experiencing any disturbance, such as network congestion, disconnection, poor quality, or any other problems relating to the streaming of the requested media content. If no such problem is encountered, the media player continues to receive the requested media content at the highest quality-level available from the first edge site in processing block 420. However, in the event of a disruption in and/or poor quality of the streaming of the requested media content from the first edge site, the IMA requests continuous information from the second, the next best available, edge site in processing block 435. Upon receiving the request, the second edge site delivers the requested media content to the media player in processing block 440. The IMA continues to monitor the media player's progress in processing block 445.

At decision block 450, the IMA continues to determine whether the media player is experiencing disturbance relating to the streaming and/or the quality of the requested media content form the second edge site. In the event that the media player encounters problems in receiving the requested media content from the second edge site, the IMA requests the requested media content from the next best edge site on the list for providing the uninterrupted stream in processing block 455, and the accessed site provides the requested media content in processing block 460. In the absence of a problem with the second edge site, the second edge site continues to provide the requested media content in processing block 440.

Figure 5:
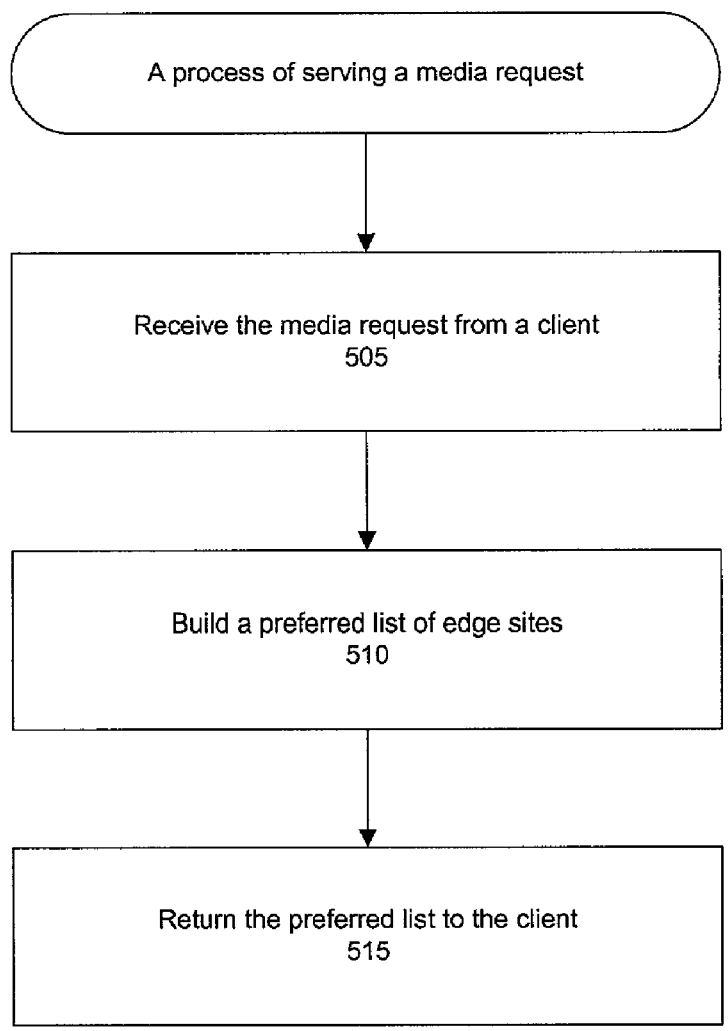
FIG. 5 is a flow diagram illustrating a process of serving a media request, according to one embodiment of the present invention.

FIG. 5 is a flow diagram illustrating a process of serving a media request, and various interactions between a data center and other components of a media delivery network, according to one embodiment of the present invention. First, the data center receives the media request from a client in processing block 505. Upon receiving the media request from the client, the data center generates a list of preferred edge sites in processing block 510. The list is generated by selecting a set of preferred edge sites from all the edge sites available on the network, based on a predetermined criteria. The predetermined criteria may include considering whether the edge sites have the requested media content, their geographical proximity to each other and the client, quality-level of the media content, and if they are congestion free. The list is then returned to the client for accessing the preferred edge sites and receiving the requested media content in processing block 515.

Figure 6:
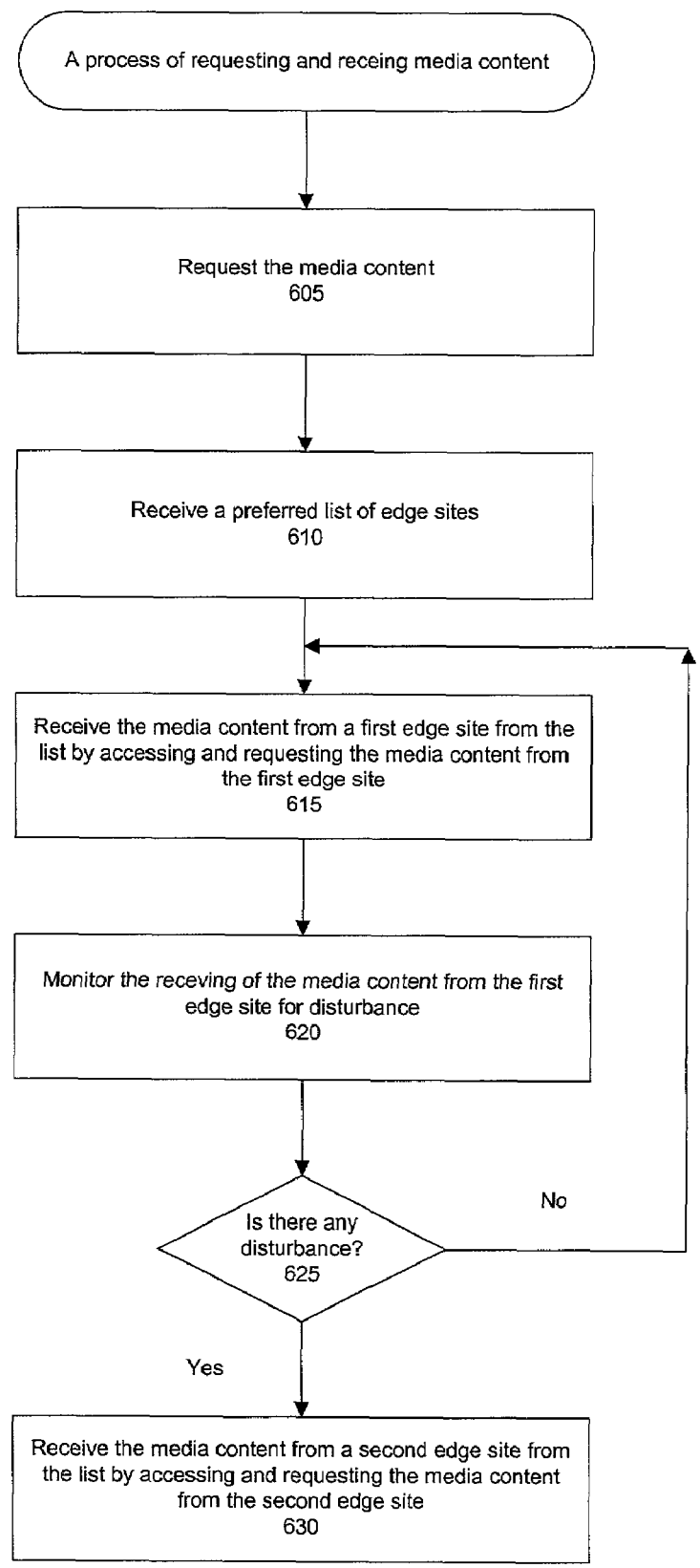
FIG. 6 is a flow diagram illustrating a process of requesting and receiving media content, according to one embodiment of the present invention.

FIG. 6 is a flow diagram illustrating a process of placing a media request and receiving media content, and various interactions between a client and other components of a media delivery network, according to one embodiment of the present invention. The client, such as a video viewer or audio player, having an Intelligent Media Accessor, places a request for media content in processing block 605. A list of preferred edge sites containing the requested media content is then received in processing block 610. Once the list is received, a first edge site, the most preferred edge site, on the list is accessed for requesting and receiving the media content in processing block 615. The process of receiving the media content from the first edge site is constantly monitored for possible streaming-related and quality-related disturbances in processing block 620. At decision block 625, if there is disturbance, a second edge site from the list is accessed for providing the media content in processing block 630, else the first edge sites continues to provide the media content in processing block 615.

Figure 7:
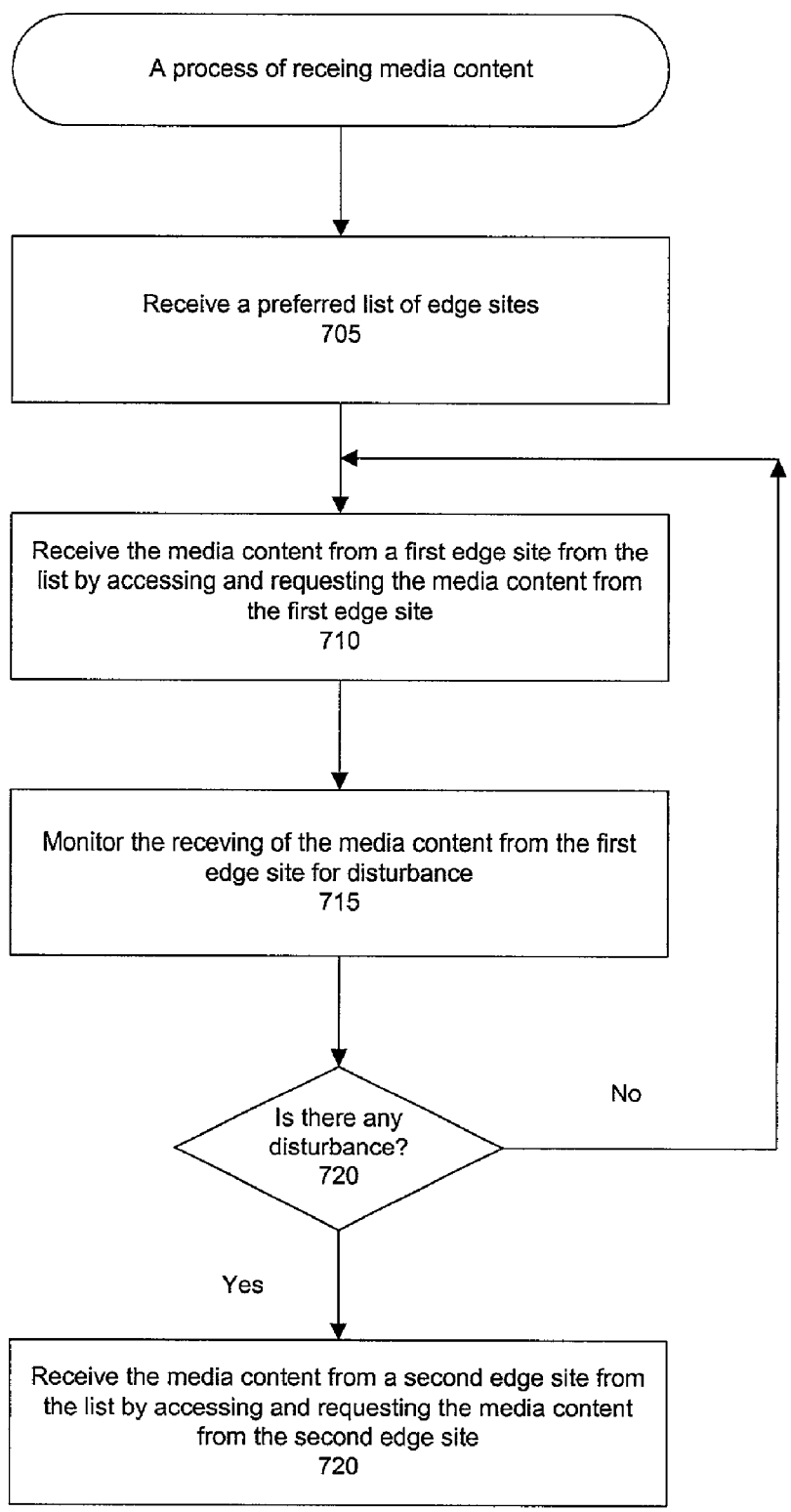
FIG. 7 is a flow diagram illustrating a process of receiving media content, according to one embodiment of the present invention.

FIG. 7 is a flow diagram illustrating a process of receiving media content, and various interactions between an Intelligent Media Accessor (IMA) and other components of a media delivery network, according to one embodiment of the present invention. The IMA receives a list of preferred edge sites, generated by a data center in response to a media request placed by a client, containing the requested media content in processing block 705. Once the list is received, a first edge site, the most preferred edge site, on the list is accessed for requesting and receiving the media content in processing block 710. The process of receiving the media content from the first edge site is constantly monitored by the IMA for possible streaming-related and quality-related disturbances in processing block 715. At decision block 720, if there is disturbance, a second edge site from the list is accessed for providing the media content in processing block 725, else the first edge sites continues to provide the media content in processing block 710.

FIGS. 8a and 8b are flow diagrams illustrating a site selection process, according to one embodiment of the present invention. According to one embodiment, an Intelligent Media Accessor (IMA) performs site selection among a plurality of sites offering the desired media using quality metrics measured by sampling portions of the desired media from the plurality of sites. For example, as illustrated in FIG. 8a, prior to establishing an initial connection, the Intelligent Media Accessor may access small samples of a clip from one or more sites in the list of preferred edge sites and measure the quality of the media in processing block 805. Then, access the site with the best quality of the media in processing block 810.

Further, the Intelligent Media Accessor monitors and measures quality even during the experiencing of media. For example, as illustrated in FIG. 8b, a viewer is receiving media from a first site in the list of preferred edge sites in processing block 850. In the background, during media viewing, the Intelligent Media Accessor may access small samples of a clip from one or more other sites in the list of preferred edge sites and measure the quality of the media in processing block 855. At decision block 860, the IMA determines whether there is a site that can produce better results than the current site. If there is one, then, transparently to the user, the IMA may switch the viewer to the site that produces the best results in processing 865. If not, the viewer continues to receive the media from the first site in processing block 870.

What is claimed is:

1. A method comprising:
   generating a preferred list of edge sites from a plurality of edge sites upon receiving a media content request from a client;
   providing the preferred list to the client;
   selecting a first edge site from the preferred list as an active site;
   requesting the media content from the first edge site;
   receiving the media content at the client, the media content being delivered from the first edge site;
   monitoring the media content being delivered from the first edge site to the client for one or more of quality of the media content being delivered, and an amount of the media content already delivered;
   determining whether a disturbance has occurred, the disturbance including pausing of the media content from being delivered due to one or more of network congestion, and a loss of network connection; and
   upon detecting the disturbance, selecting a second edge site from the preferred list as a new active edge site to continue to deliver the media content to the client, if the second edge site satisfies a plurality of factors, the plurality of factors including one or more of the new active edge site having the media content, the new active edge site being capable of delivering an uninterrupted stream of the media content, the new active edge site being capable of delivering the media content at an acceptable quality level, geographical proximity of the new active edge site, and network availability of the active edge site, wherein the acceptable quality level of the media content is determined by sampling portions of the media content obtained from the plurality of edge sites and comparing the portions against quality of other media content displayed at the client.

2. The method of claim 1, wherein the generating of the preferred list is performed by a server, based on a predetermined criteria.

3. The method of claim 1, wherein the disturbance further comprises one or more of interrupting of the media content from being delivered; delaying of the media content from being delivered, slowing of the media content from being delivered, lowering of the quality of the media content, and stopping of the media content from being delivered.

4. The method of claim 1, further comprising selecting a third edge site from the preferred list as the active site, if the second edge site fails to satisfy the plurality of factors.

5. A system comprising:
a server to receive a request for media content from a client, the server to generate a preferred list of edge sites from a plurality of edge sites upon receiving the request for the media content from the client, and provide the preferred list to the client; and
the client coupled with the server, the client to receive the preferred list from the server,
select a first edge site from the preffrred list as an active site,
request the media content from the first edge site,
receive the media content from the first edge site,
monitor the media content being delivered from the first edge site for one or more of quality of the media content being delivered, and an amount of the media content already delivered,
determine whether a disturbance has occurred, the disturbance including pausing of the media content being delivered due to one or more of network congestion, and a loss of network connection, and
upon detecting the disturbance, select a second edge site from the preferred list as a new active site to continue to receive the media content from the second edge site, if the second edge site satisfies a plurality of factors, the plurality of factors including one or more of the new active edge site having the media content, the new edge site being capable of delivering an uninterrupted stream of the media content, the new active edge site being capable of delivering the media content at an acceptable quality level, geographical proximity of the new active edge site, and network availability of the active edge site, wherein the acceptable quality level of the media content is determined by sampling portions of the media content obtained from the plurality of edge sites and comparing the portions against quality of other media content displayed at the client.

6. The system of claim 5, wherein the server is further to generate a table indicating the media content of edges sites, and providing the table to the client via the preferred list of edge sites.

7. A machine-readable medium having instructions which, when executed, cause the machine to:

generate a preferred list of edge sites flow a plurality of edge sites upon receiving a media content request from a client;
provide the preferred list to the client;
select a first edge site from the preferred list as an active site;
request the media content from the first edge site;
receive the media content from the first edge site;
monitor the media content being delivered from the first edge site for one or more of quality of the media content being delivered, and an amount of the media content already delivered,
determine whether a disturbance has occurred, the disturbance including pausing of the media content being delivered due to one or more of network congestion, and a loss of network connection; and
upon detecting the disturbance, selecting a second edge site from the preferred list as a new active edge site to continue to deliver the media content to the client, if the second edge site satisfies a plurality of factors, the plurality of factors including one or more of the new active edge site having the media content, the new edge site being capable of delivering an uninterrupted stream of the media content, the new active edge site being capable of delivering the media content at an acceptable quality level, geographical proximity of the new active edge site, and network availability of the active edge site, wherein the acceptable quality level of the media content is determined by sampling portions of the media content obtained from the plurality of edge sites and comparing the portions against quality of other media content displayed at the client.

8. The machine-readable medium of claim 7, wherein the generating of the preferred list is performed based on a predetermined criteria.

9. The system of claim 5, wherein the disturbance further comprises one or more of interrupting of the media content from being delivered; delaying of the media content from being delivered, slowing of the media content from being delivered, lowering of the quality of the media content, and stopping of the media content from being delivered.

10. The system of claim 5, wherein the client is further to select a third edge site from the preferred list as the active site, if the second edge site fails to satisfy the plurality of factors.

11. The machine-readable medium of claim 7, wherein the disturbance further comprises one or more of interrupting of the media content from being delivered; delaying of the media content from being delivered, slowing of the media content from being delivered, lowering of the quality of the media content, and stopping of the media content from being delivered.

12. The machine-readable medium of claim 7, further comprising selecting a third edge site from the preferred list as the active site, if the second edge site fails to satisfy the plurality of factors.

* * * * *

UNITED STATES PATENT AND TRADEMARK OFFICE
CERTIFICATE OF CORRECTION

| | | |
|---|---|---|
| PATENT NO. | : 7,454,485 B2 | Page 1 of 1 |
| APPLICATION NO. | : 09/895432 | |
| DATED | : November 18, 2008 | |
| INVENTOR(S) | : Kukkal et al. | |

It is certified that error appears in the above-identified patent and that said Letters Patent is hereby corrected as shown below:

In column 9, at line 24 delete, "preffrred" and insert --preferred--.

Signed and Sealed this

Twenty-second Day of December, 2009

David J. Kappos
*Director of the United States Patent and Trademark Office*